UNITED STATES PATENT OFFICE.

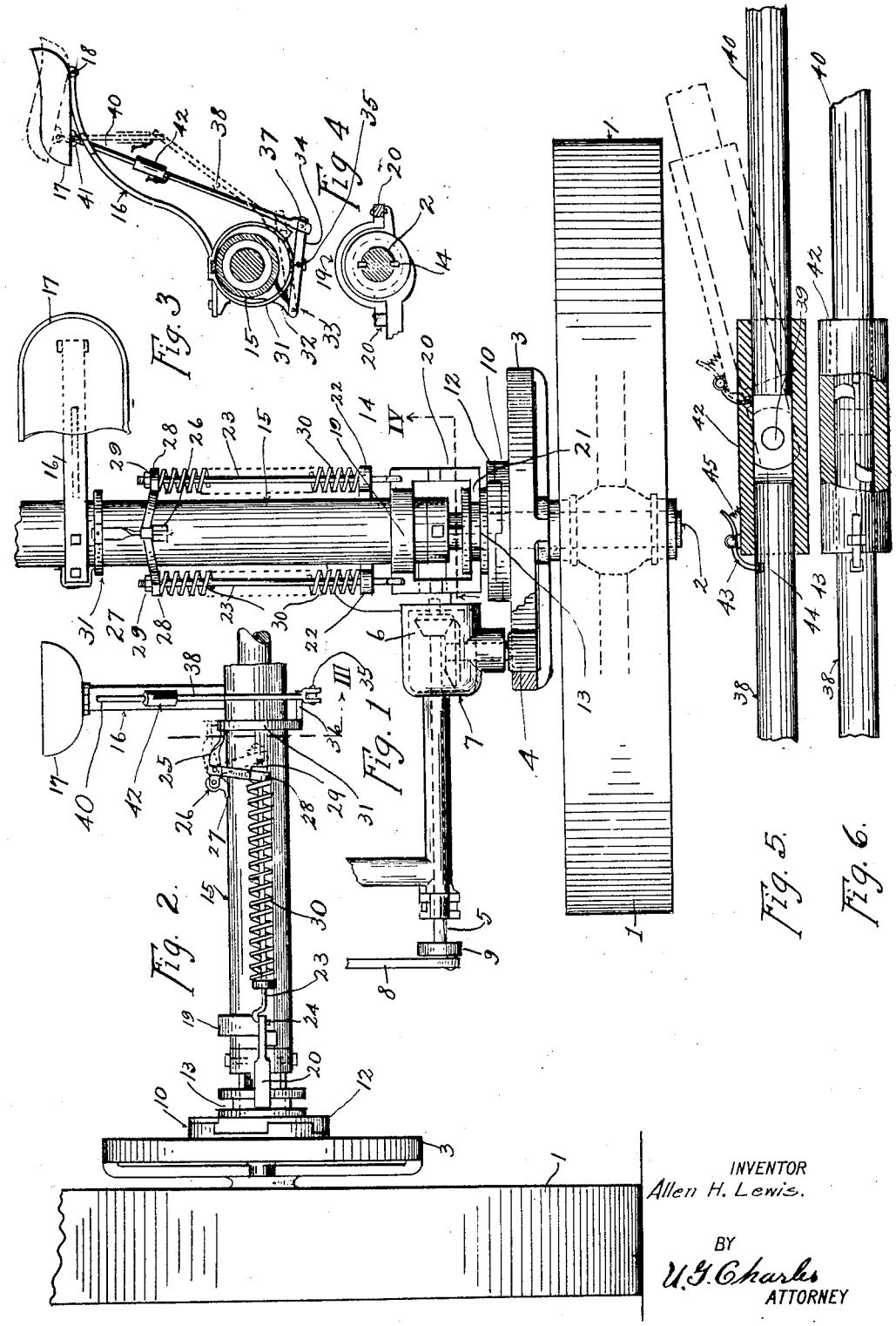

ALLEN H. LEWIS, OF WICHITA, KANSAS.

SEAT AUTOMATIC GEAR CONTROL.

1,347,641.  Specification of Letters Patent.  Patented July 27, 1920.

Application filed October 27, 1919. Serial No. 333,649.

*To all whom it may concern:*

Be it known that I, ALLEN H. LEWIS, a citizen of the United States of America, and resident of Wichita, in the county of Sedgwick and State of Kansas, have invented certain new and useful Improvements in Seat Automatic Gear Controls, of which the following is a specification.

This invention relates to attachments for any kind of wheeled agricultural implement in which a mechanism is driven by the "bull wheel" and a seat is provided for the driver. The improvement will be especially useful in connection with reapers and mowers. The usual reaper and mower of the type aforesaid is provided with a hand-lever by which the driven mechanism may be disconnected from a driving member; but in practice it often occurs that when the cutters become fouled the driver stops the machine, forgets to open the clutch or its equivalent, and proceeds to clear the knives with his hands. If the horses start while this work is being done, the cutters are thereby started and frequently mutilate the operator's fingers or feet. By the use of my improvement, the starting of the cutters (for example) is impossible when the driver is out of his seat, though of course the machine as a whole may be started. By an added feature of construction, the mowing mechanism may also be disconnected when the driver is seated, so that the implement can be moved about without actuating said mechanism.

In the accompanying drawings, Figure 1 is a top plan view of the improvements installed upon a mowing machine, certain parts of the latter being omitted. Fig. 2 is a rear elevation of Fig. 1. Fig. 3 is a vertical section taken on line III of Fig. 2. Fig. 4 is a sectional detail taken on line IV of Fig. 1. Fig. 5 is a detail view, partly in section, of a device shown in Fig. 3. Fig. 6 is another partly sectional view at right angles to that of Fig. 5.

Referring more in detail to the parts: 1 is the bull-wheel, 2 is the live axle on which it is keyed, 3 is an internal gear wheel, loose on the axle 2; 4 is the pinion driven by said gear, 5 is a shaft driven through gears 6, 7; 8 is a pitman driven by a crankwheel 9.

A clutch member 10 is made integral with or secured to the gear wheel 3. A companion clutch member 12, having a hub in which is the annular groove 13, is splined on axle 3 with keys 14.

The tubular housing 15 is a usual part of such machines and needs no description. On said housing is fastened the lower end of the seat-supporting spring 16. Instead of mounting the seat 17 rigidly upon said spring, I provide a pivotal mounting 18, under the back of the seat, whereby the seat is movable upwardly to the position indicated by dotted lines. (Fig. 3.)

For shifting the sliding clutch member 12 I employ a C shaped part comprising an arched portion 19, and a pair of arms 20 having inwardly projected portions 21 which enter loosely the groove 13. Arched portion 19 rests on the housing 15. Two lugs 22, cast on housing 15, form guides for a pair of rods 23 having hooks 24 passing through holes in the shipper arms 20.

A short lever 25 is pivoted on a lug 26 cast on housing 15. To said lever is rigidly secured an arched bar 27, whose ends have eyes 28 through which pass the rods 23, which are threaded to receive nuts 29. On each rod 23 is a helical spring 30 which is under compression between the fixed lugs 22 and the movable bar 27. The end of lever 25 is secured to the top of a ring 31, of larger diameter than housing 15, which encircles the latter and is normally held in raised position by the springs 30 acting through lever 25. A lug 32 cast on the housing, supports a pivot 33 on which is pivoted a lever 34 (Fig 3). Halfway between its ends this lever is pivoted at 35 to a finger 36 rigidly projecting from ring 31. The end of lever 34 is pivoted at 37 to a lower push-rod 38, which is connected by a toggle joint 39 with an upper push-rod 40, the upper end of which is connected pivotally to the underside of the seat at 41. The rod sections 38, 40 may be considered as a jointed rod, and are so termed in one of my claims. Normally said sections are held in straight alinement by means of a slidable metal sleeve 42, having a latch 43 entering a notch or hole in rod 38, said latch being held in such position by a spring 45.

Due to the springs 30, the seat 17 will normally be held in the uptilted position shown by dotted lines, and it will be apparent that when the seat is depressed by the driver's weight, the motion will be transmitted through rods 40, 38, lever 34, ring 31, lever 25, bar 27, rods 23 and shipper 20 to clutch member 12, which will thereby be held in engagement with member 10, thus placing the shaft 9 in gear with the driving axle. Now whenever the driver leaves the seat, the springs 30 expand, pushing the bar 27 inwardly, which moves the rods 23 the same distance, thus drawing clutch member 12 clear of its companion member.

When the machine is to be hauled on its own wheels without driving the mowing (or other) mechanism, the driver disengages the latch 43 and slides the sleeve upon rod section 40 to the position shown in dotted lines (Fig. 5), then pulls the joint 39 back to bring the rods to an angle as indicated, which virtually shortens the rods and permits the springs 30 to hold the clutch open for the purpose stated. When the mechanism is to be used again the rods 38, 40 (or rod 38—40) are placed in alinement and the sleeve 42 is replaced over the joint 39, thus raising the front end of the seat.

Having described my invention, I claim, and desire to secure by Letters Patent:

In an agricultural implement, a clutch, a vertically movable seat, means operatively connecting said clutch with said seat, and a spring for simultaneously opening said clutch and lifting said seat; one element of said operative connecting means being constructed to be shiftable in such manner as to permit of the opening of said clutch when said seat is in depressed position.

ALLEN H. LEWIS.

Witnesses:
W. A. NETHERCOT,
NELLIE M. PORTER.